Nov. 22, 1955
H. F. BRANDT
2,724,305
APPARATUS FOR RECORDING EYE MOVEMEMENT
Filed Sept. 4, 1951
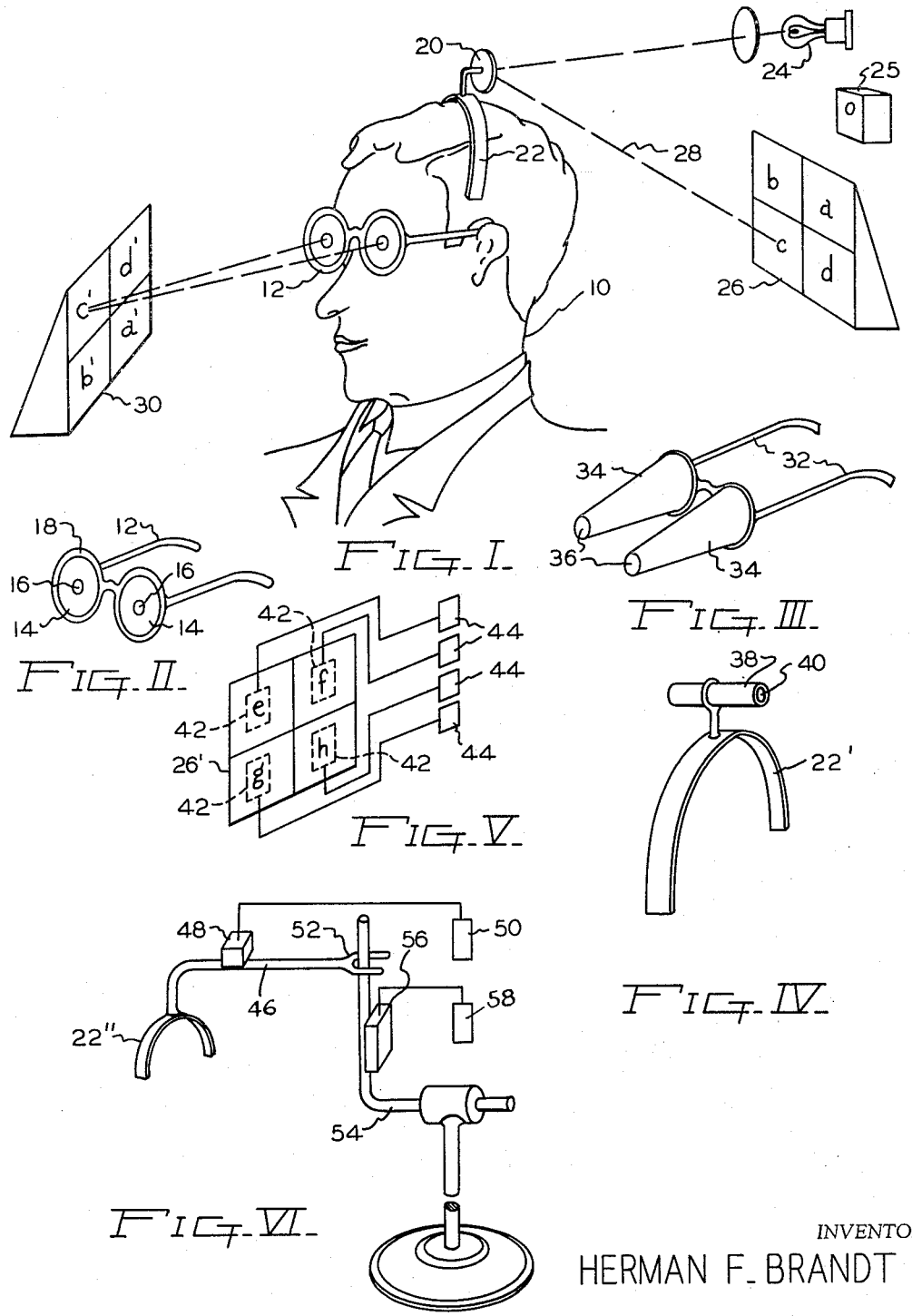
INVENTOR
HERMAN F. BRANDT
BY Townsend F. Beaman
ATTORNEY United States Patent Office 2,724,305
Patented Nov. 22, 1955

2,724,305

APPARATUS FOR RECORDING EYE MOVEMENT

Herman F. Brandt, Hillsdale, Mich.

Application September 4, 1951, Serial No. 244,938

1 Claim. (Cl. 88—20)

The present invention relates to improvements in method and apparatus for studying and recording the ocular performance of eye movement in the bi-dimensional plane.

Apparatus heretofore proposed for carrying out the objects of the present invention have been expensive in construction and complicated in operation. In lieu of photographing the eye direct, as shown in my Patent No. 2,229,721 granted January 28, 1941, I now propose to employ a simple device which induces the head of the subject being tested to follow the movement of the subject's eye. This is carried out by having the subject view the field of observation through glasses, or other equivalent structure, in which only a small area is provided through which the subject can see clearly, with reduced visibility being preferably provided in the peripheral area. In this way an effect is provided comparable to the normal human eye which can see clearly only in one special area of the retina causing the eye to rotate in such a way that the point of clearest vision (fovia centralis) is in direct line of regard with the object being observed. Thus, when the subject elects to look at another area of a given field he simply rotates his eye so the fovia again falls on the area to be clearly seen. By compelling the subject to align the fovia centralis with a small aperture of clear vision which is fixed to the head, the head will follow the movement of the eyes and the movement of the eyes may be studied and recorded by studying and recording the movement of the head.

Thus, one of the objects of the invention is to provide an improved method of studying and recording the movement of the eyes by coupling the eye movement to that of the head.

Another object is to provide an improved apparatus for studying and recording the ocular performance of eye movement in the bi-dimensional plane in which means attached to the head couple the head to the eye movement.

Another object is to provide an improved apparatus of the type described in which the subject under observation aligns the fovia centralis with the area of observation through an aperture affixed to the head, by moving the head, with the deviation of the head being the sole subject of study and recording.

These and other objects and advantages residing in the specific construction, arrangement and combination of parts will more fully appear and will be appreciated by those skilled in the art from a consideration of the following specification and the appended claims.

In the drawings where several forms of the invention are illustrated,

Fig. I is a schematic drawing showing the apparatus applied to a person's head and the associated viewing and recording structure, Fig. II is a perspective view of a pair of eye glasses modified to embody the principles of the present invention, Fig. III is a view similar to Fig. II of a modified form of the device for restricting the area of clear vision, Fig. IV is a perspective view of a modified form of head gear carrying a light source for recording purposes, Fig. V is a schematic showing of an arrangement for recording the eye movement through photoelectric cells and counters, and Fig. VI shows apparatus associated with the head gear for recording the movement of the eyes through mercury switch structure.

Referring to the drawings, in Fig. I is shown a simple arrangement for carrying out the principles of the present invention. The subject 10 to be tested is provided with a device for coupling the movement of the eyes to that of the head. As shown in Fig. I, this device takes the form of a pair of glasses 12 having a standard frame, in which is fitted specially prepared lens 14 preferably characterized by the fact that only a relatively small area 16 provides clear vision with reduced visibility being provided in the peripheral areas 18.

By reducing the field of clear vision to the small area 16, this produces the same effect as is present in the normal human eye which can see clearly only in one special area of the retina. In looking at a picture or copy in print, the eye rotates in such a way that the point of clearest vision, known as the fovia centralis, is in direct line with regard to the object being observed. Whenever the subject elects to look at another area in a given field he simply rotates his eyes so that the fovia again falls on the area to be seen clearly.

The peripheral area 18 may be only slightly clouded to give a degree of visibility yet provide such contrast with the clear vision area 16 to persuade the subject 10 to move his head rather than his eyes relative thereto. Many arrangements for observing and recording the movement of the head of the subject 10 will suggest themselves to those skilled in the art. As shown in Fig. I, a mirror 20, carried on a head gear 22, may reflect a light beam from the source 24 upon a suitable surface or screen 26, having areas a, b, c and d. As the head is moved the reflected light beam will provide a spot on the screen 26 which may be observed in time in the areas a, b, c and d. If desired, the screen 26 may be photographed during the testing of the subject 10 by the camera 25. In this manner, the movement of the spot in the areas involved will be recorded as well as the time that the spot remains in any particular area.

Located before the subject 10 is a test panel 30 which may correspond in size and location to the screen 26 located back of the subject 10, with the areas a', b', c' and d'. When the subject 10, equipped with special glasses 12, observes a particular part of the area c' with clear vision the head will be in a position to reflect the light beam 28 against the corresponding part of the area c of the screen 26. With the glasses 12 coupling the head and eye movement, as the subject 10 scans the test panel 30 with his eyes, the head has a corresponding movement which may be observed or recorded or both on the screen 26, or other suitable means.

In Fig. III is shown another form of the device for coupling the movement of the eyes and head. As shown, in lieu of the lenses 14, the frame 32 supports a pair of conical tubes 34 before the eyes with clear vision being reduced to the size of the small openings or apertures 36.

Fig. IV shows the head gear 22' equipped with a light source 38 having a suitable lens for providing a narrow light beam corresponding and functioning in the manner of the reflected beam 28 of Fig. I.

In the modification of Fig. V, the screen 26' is shown having areas e, f, g and h, having associated therewith suitable light sensitive cells indicated at 42 which are coupled to suitable electronic counting units 44 which continue to count at a given rate during periods that the electrical circuit associated with each counter 44 is closed by the associated light sensitive cell 42. In this manner, the area in which the light is being reflected as in Fig. I may be determined and at the same time the length of time that the light is in any particular area is recorded by the device 44.

A further modification of the invention is shown in Fig. VI wherein suitable head gear 22" carries rigidly therewith a bracket 46. Supported on one portion of the bracket 46 is a mercury switch 48 which, upon tilting of the head either forward or backward, will result in the electrical circuit being closed and connected with the electronic recorder 50. The bracket 46 is shown having a forked end 52 which is adapted to operate a rocker arm 54 carrying a mercury switch 56 which, upon being tilted in either direction from the vertical through horizontal pivoting of the bracket 46, will result in the electrical circuit being closed and the head movement recorded upon the electronic recorder 58. With this apparatus the mercury switches can be employed to indicate up and down movement or side movement of the head as would result from the subject 10 observing, upon a test panel, the various areas $a'$, $b'$, $c'$ and $d'$.

I claim:

Apparatus for recording eye movement and direction and duration of gaze of a person observing different portions of a given subject, comprising in combination a first device to be carried by the head for movement therewith and located before the eyes and having a substantially reduced area of clear vision as compared to the normal area of clear vision, through which said person looks from portion to portion of said subject solely by moving the head, means for recording eye movement and direction and duration of gaze, means having a photo-sensitive area for actuating said recording means, and a second device to be carried by the head for movement therewith and adapted to direct a beam of light onto said photo-sensitive area for actuating said recording means so that when said person moves the head to observe different portions of said subject under restraint of said first device, said second device will play said beam of light over said photo-sensitive area to actuate said recording means to record the direction and time period of said movement.

References Cited in the file of this patent

UNITED STATES PATENTS

| | | |
|---|---|---|
| 1,313,262 | Compere | Aug. 19, 1919 |
| 2,229,721 | Brandt | Jan. 28, 1941 |
| 2,238,207 | Ames, Jr., et al. | Apr. 15, 1941 |
| 2,288,430 | Bauman | June 30, 1942 |
| 2,311,914 | Tiffin et al. | Feb. 23, 1943 |
| 2,325,569 | Hancock et al. | July 27, 1943 |

OTHER REFERENCES

Supplementary Educational Monographs (University of Chicago), No. 21, 1922, by G. T. Boswell, pages 11–13.